(12) United States Patent
Herkenhoff et al.

(10) Patent No.: US 6,754,591 B1
(45) Date of Patent: Jun. 22, 2004

(54) METHOD FOR PROCESSING SEISMIC TRACES TO PROVIDE SEISMIC DATA WITH ENHANCED SIGNAL-TO-NOISE RATIO

(75) Inventors: E. Fredrick Herkenhoff, Orinda, CA (US); Jonathan D. Cocker, Oakland, CA (US); Harry L. Martin, San Ramon, CA (US)

(73) Assignee: Chevron U.S.A., San Ramon, CA (US)

(*) Notice: Subject to any disclaimer, the term of this patent is extended or adjusted under 35 U.S.C. 154(b) by 0 days.

(21) Appl. No.: 10/330,401

(22) Filed: Dec. 27, 2002

(51) Int. Cl.[7] .................................................. G01V 1/28

(52) U.S. Cl. ........................................................ 702/14

(58) Field of Search ............................... 702/14, 16, 17, 702/18; 703/6, 9, 10; 367/73

(56) References Cited

U.S. PATENT DOCUMENTS

| | | | |
|---|---|---|---|
| 5,596,547 A | * | 1/1997 | Bancroft et al. .............. 367/51 |
| 6,026,058 A | | 2/2000 | Thomas |
| 6,292,754 B1 | * | 9/2001 | Thomsen ..................... 702/14 |
| 6,556,921 B1 | * | 4/2003 | Hardage et al. .............. 702/14 |

OTHER PUBLICATIONS

Arnold, R., Chiburis, E., Avo—Current Status and the Future, Society of Exploration Geophysicists, Expanded Abstracts, 1998 Annual Convention Collection Series, 248–250, 1998.

Hocker, C., Fehmers, G., Fast Structural Interpretation With Structure–Oriented Filtering, The Leading Edge, 238–243, 2002.

\* cited by examiner

*Primary Examiner*—Donald McElheny, Jr.
(74) *Attorney, Agent, or Firm*—Richard J. Schulte

(57) ABSTRACT

A method for processing seismic traces to provide enhanced signal-to-noise ratio in seismic data is provided. A seismic survey of traces is obtained which has been collected over an areal region containing a grid of nodes. A rolling supergather aperture is used to select a subregion containing a working subset of traces. A model subset of traces is selected from proximate the center of the working subregion. The model subset of traces are composited to form a model trace. A modified subset of traces is created by comparing the individual traces with the model trace using an alignment technique, which is preferably a time varying trim statics technique. These modified subsets of traces may then be composited into a reduced set of enhanced seismic traces having enhanced signal-to-noise ratio relative to the original seismic traces. The rolling supergather aperture is then incrementally moved until traces from all over the areal region are chosen and enhanced subsets of seismic traces have been assembled into a set of seismic data having enhanced signal-to-noise ratio.

20 Claims, 3 Drawing Sheets

METHOD FOR PROCESSING SEISMIC TRACES TO PROVIDE SEISMIC DATA WITH ENHANCED SIGNAL-TO-NOISE RATIO

FIELD OF THE INVENTION

The present invention relates generally to methods of seismic data processing, and more particularly, to methods of enhancing signal-to-noise ratio of seismic data.

BACKGROUND OF THE INVENTION

The signal-to-noise (S/N) ratio of pre-stack and post-stack seismic data is often poor. Subsequently, this poor S/N ratio can result in very low quality derivative attributes such as gradient sections. Other properties of seismic displays which are also adversely affected by poor S/N ratio include continuity and resolution. Other products derived from seismic data, and which are highly dependent upon S/N ratio, include amplitude versus offset (AVO) attributes, offset sections and final stacks.

AVO attributes, such as gradient sections, are typically extremely noisy compared to stack data. Most commonly this increases the uncertainty in the prediction process (due to scatter), and hence reduces the power of AVO analysis as a clear Direct Hydrocarbon Indicator (DHI). In areas where seismic data quality is poor the attribute sections are often too noisy to be of any significant use. The main causes for this reduction in S/N ratio, and hence degraded attribute estimation, are the presence of coherent and random noise, transmission effects and Normal Moveout (NMO) errors in the seismic data.

There are numerous techniques employed to increase S/N ratio in seismic data. Examples of such techniques to cleanup seismic data prior to calculating derivative attributes include F-X deconvolution, FK filtering, and bandpass filtering.

The method of supergathering helps to increase S/N ratio of seismic data. Seismic data within a supergather are typically summed together. Such supergathering method of seismic data enhancement has serious shortcomings. Because the traces of the entire subregion are averaged together, the traces tend to blur together, i.e. spatial resolution is reduced, and highly distinctive traces are averaged out or significantly reduced.

There is a need for a method which is significantly more effective at improving the signal-to-noise ratio of seismic data while retaining spatial resolution. The present invention addresses this need.

SUMMARY OF THE INVENTION

The present invention is a method for processing seismic traces to provide seismic data with enhanced signal-to-noise (S/N) ratio. This allows for improved seismic displays. Further, other downstream products reliant upon seismic data will likewise benefit from the enhanced S/N ratio provided by the present invention.

FIG. 1 shows a flow chart of steps which may be used with the present invention. A seismic survey of traces is obtained which has been collected over an areal region. The seismic survey includes a grid of nodes. Each node ideally is representative of traces from a common reflection point (CRP).

A working subset of traces is selected from a subregion of the areal region. A rolling supergather aperture is used to select the working subset of traces. The rolling supergather aperture is positioned relative to an output node for which modified seismic traces are to be created.

A model subset of traces is selected from the working subset of traces using a predetermined set of rules such that the model subset of traces is selected from proximate the center of the working subregion. Most typically, the set of rules results in the traces from only the center most node of the rolling supergather aperture being selected for inclusion in the model subset of traces. The model subset of traces is composited to ideally form a single model trace.

Next, the individual traces of the working subset of traces are compared and modified with the model trace using an alignment technique. Preferably, a dynamic static correction, such as a time varying trim statics technique, is used to align the original traces to the model trace with a new modified subset of traces being created. Preferably, the modified subset of traces is composited and reduced in size to an enhanced subset of traces having an enhanced signal-to-noise ratio as compared to the original working subset of traces.

The rolling supergather aperture is then incrementally moved such that it is repositioned relative to another of the nodes to thereby select another working subset of traces from the areal region. The steps identified above are repeated to transform the traces of the new working subset of traces into a new modified subset of traces and, ideally, subsequently an enhanced subset of traces. This process is continued until the rolling supergather aperture has covered the entire areal region and enhanced subsets of traces have been created for each output node. The modified seismic survey may then be used to produce an enhanced seismic display.

The present invention further includes a computer-readable medium containing executable code for processing seismic traces to provide seismic data with enhanced signal-to-noise ratio. The code, when executed, ideally performs the above described steps to provide seismic data with enhanced signal-to-noise ratio which may be used to create enhanced display traces.

It is an object of the present invention to use rolling supergathers with a dynamic static correction to significantly improve S/N in pre-stack data and attribute sections.

It is another object of the present invention to improve the quality of attributes to increase the reliability of quantitative amplitude analysis.

It is a further object to provide a method to ensure that a dynamic static solution maintains structure and is an edge preserving process.

BRIEF DESCRIPTION OF THE DRAWINGS

These and other objects, features and advantages of the present invention will become better understood with regard to the following description, pending claims and accompanying drawings where:

BEST MODE(S) FOR CARRYING OUT THE INVENTION

A method utilizing rolling supergathers, in combination with dynamic static corrections, has been developed to improve the S/N ratio of seismic data. The method results in significant increases in the coherency and resolution of gathers and of the Amplitude Versus Offset (AVO) attributes derived from those gathers. This increase in S/N ratio results in a considerable reduction in the large scatter normally seen in AVO attribute cross-plots. The invention further comprises a computer-readable medium containing executable code which can carry out the steps of the method to provide seismic data with enhanced signal-to-noise ratio.

The supergathers can also be used to create a much improved stack section for structural interpretation. Driving the pilot trace used in the dynamic static correction to the stack trace of a center Common Reflection Point (CRP) gather, within each supergather, is a distinctive and important step in the preferred embodiment of this approach, as it ensures that smearing is avoided. An exemplary use of seismic data enhanced using the method of the present invention will be described below and is displayed in FIG. 5.

The method of the present invention ideally collects a 2D or 3D aperture of CRP gathers or stacked traces into one ensemble or working subregion. The present method then preferably uses a constrained time variant trim statics correction method, wherein the traces of the center CRP gather are used as the pilot or model trace in the trim static calculation. This ensures that the static solution maintains structure and is an edge preserving process, something that conventionally supergather methods fails to do. The utilization of a CRP gather is a unique part of this process and is a key to the method of the present invention solving several problems in one process.

Figure 1:
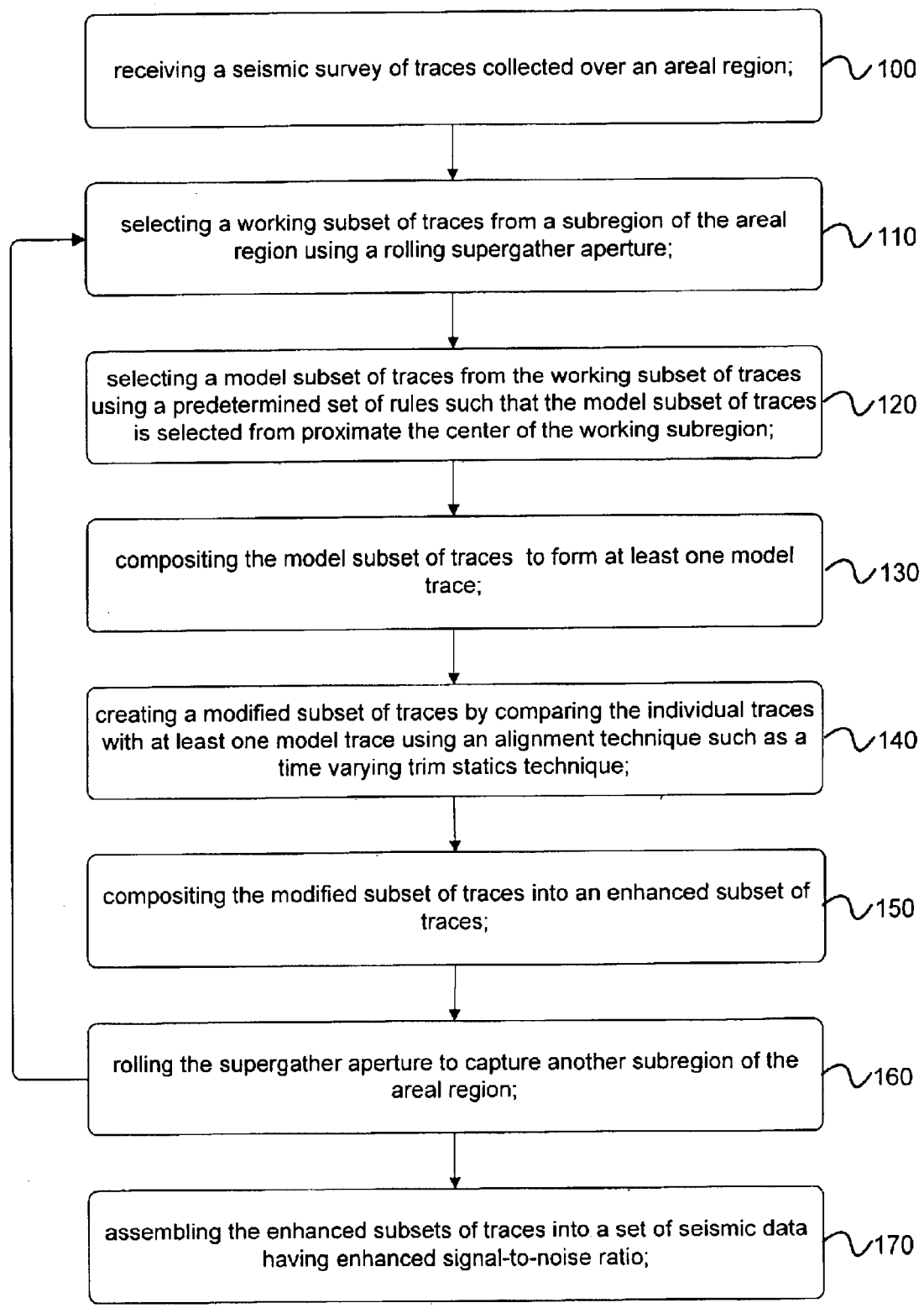
FIG. 1 is a flowchart of steps, made in accordance with the present invention, used to process seismic traces to provide seismic data with improved signal-to-noise (S/N) ratio.

The method, made in accordance with a preferred embodiment of the present invention, will now be described in more detail. The present method processes seismic traces to provide seismic data with enhanced signal-to-noise ratio. This enhanced seismic data may be used to create enhanced display traces. The method comprises the following steps, which are outlined in the flowchart of FIG. 1.

A seismic survey of traces are received in step 100 which have been collected over an areal region 20. The seismic data is preferably CRP data. Examples of other types of data which may used include stacked data and angle gathers The survey may be either a 2D survey or a 3D survey.

Figure 2:
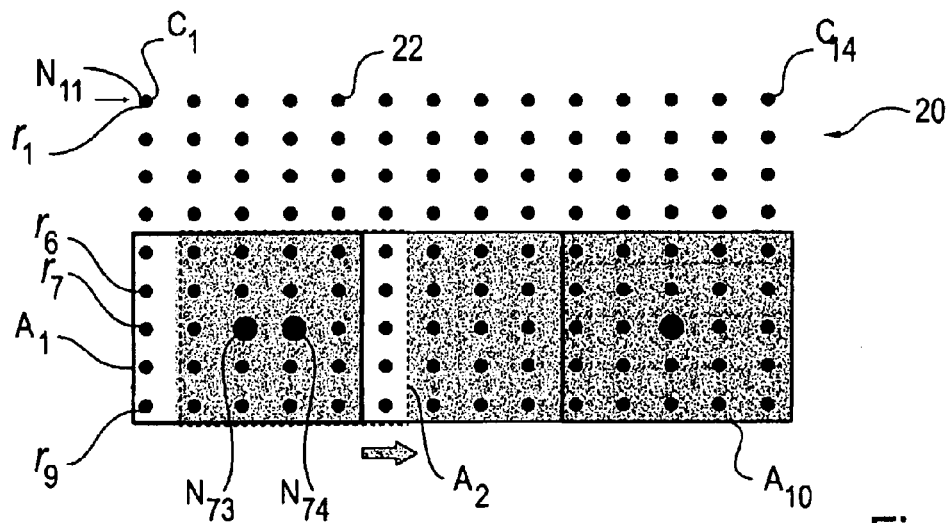
FIG. 2 is a schematic drawing of an areal region having a grid of nodes and a rolling supergather aperture, as shown by a sequence of rolling boxes, which serves to incrementally select working subsets of traces for processing.

As shown in FIG. 2, the areal region 20 includes a grid 22 of nodes N. In this exemplary illustration, grid 22 is a rectangular array having 9 rows r and 14 columns c for a total of 126 nodes. Of course, in an actual seismic survey, there will be thousands of such nodes. Other array patterns may also be used with this invention, such as circular arrays or elliptical arrays. The original or pre-processed traces can be processed as pre-stack or post-stack seismic data. For the purposes of this specification, an input node N will be used to describe a node associated with unprocessed or input seismic data. An output node N shall refer to a node having associated seismic traces which have been processed or output according to the present invention. Individual nodes N will be designated by their particular row and column position in the array, i.e. $N_{rc}$.

A first working subset of traces from a subregion of the overall areal region 20 is then selected in step 110. A rolling supergather aperture $A_1$, as shown in FIG. 2 as a square box, is used to establish which of the subset of traces from the nodes N are to be included in the working subset. In this instance, seismic traces from the nodes N of rows 5 through 9 in columns 1 through 5 are captured by aperture $A_1$. Aperture A will be incrementally moved or rolled throughout the areal region 20, as will be described below. The subscript "1" represents that this is the first incremental step in using the rolling supergather aperture.

In this exemplary embodiment of the invention, aperture $A_1$ is selectively positioned to be centered at node $N_{73}$, which is at the center of the subregion containing the input nodes N of interest and their associated traces. Also, aperture $A_1$ is a square 5×5 array including nodes N contained in 5 rows and 5 columns.

Figure 3:
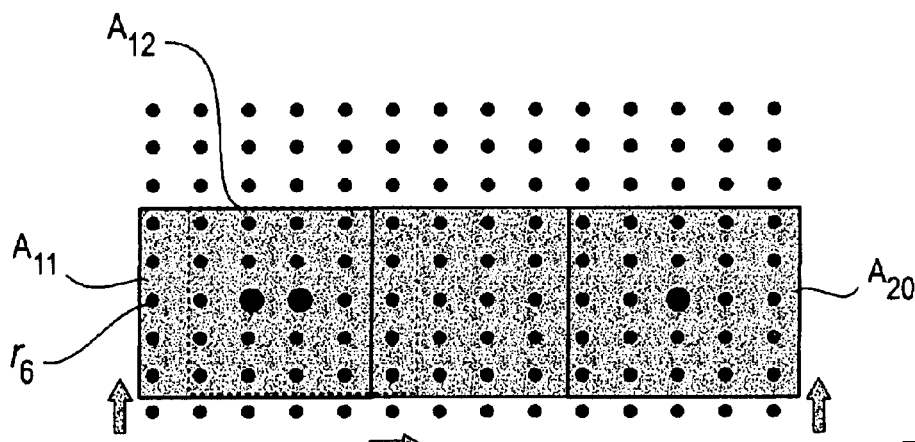
FIG. 3 is a schematic drawing, similar to that of FIG. 2, wherein the rolling supergather aperture has been translated vertically up one row to incrementally traverse that row.
Figure 4:
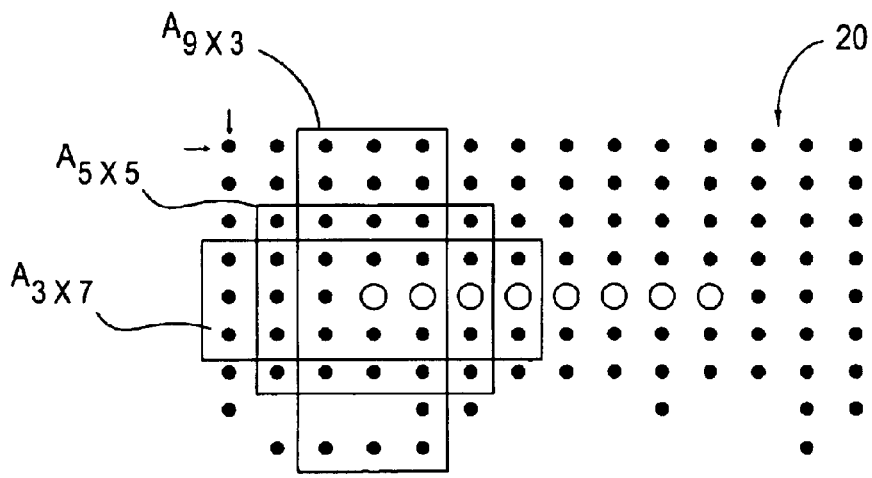
FIG. 4 is a schematic drawing, similar to FIGS. 2 and 3, illustrating that numerous sizes and shapes of rolling supergather apertures may be employed in conjunction with the present invention.

FIG. 4 illustrates that this invention contemplates that rolling supergather apertures A of different shapes and sizes can be used to select the working subset of traces from the overall areal region 20. Examples of aperture sizes and shapes include a 5×5 array $A_{5\times5}$, a 3×7 array $A_{3\times7}$, and a 9×3 array $A_{9\times3}$, all of which are rectangular in shape. Other shapes of apertures, such as circular or elliptical shapes, are also within the scope of this invention. While in the preferred embodiment of FIGS. 2 and 3, a 5×5 array is utilized, use of other sizes and shapes of apertures may be advantageous when, for example, grid spacing is not equal or structural dip is more pronounced or dominant in one grid direction than another.

The next step, step 120, is to select a model subset of traces from the working subset of traces found within an aperture A. This model subset of traces may be selected using a variety of predetermined sets of rules. In this preferred exemplary embodiment, the model subset is selected from proximate the center of the working subset of traces in aperture $A_1$. More particularly, the model subset of traces are selected only from the center node $N_{73}$ or the center CRP gather for aperture $A_1$. Accordingly, the rule of selection for choosing this particular subset of model traces is to simply choose the traces at the center node of the working subset of traces.

Alternative rules for selecting a model subset of traces may include, but are not limited to:

(a) selecting traces from two or more nodes along the center portion of the center row of an array;

(b) selecting traces from two or more nodes along the center portion of the center column of an array; and (c) selecting traces from within a radius of nodes, again preferably centered at the center node of the working subset of traces.

Selecting traces from proximate the center of the working subregion defined by an aperture A, and most preferably, from only the center node N of that aperture A, has the advantage of not spatially smoothing data. This preserves edges.

The next step, step 130, in this method is compositing the traces of the chosen model subset of traces into at least one model trace. Preferably, these traces are summed into a single model or pilot trace. In this case, the traces are simply algebraically added together and processed to form a single model trace. Of course, the traces must be adjusted for Normal Move-Out (NMO) prior to their summation. Other methods of compositing can also be used to produce a single model trace. Alternatively, rather than reducing the model subset of traces to a single model trace, an alternative model set of traces could be constructed by compositing the traces in the model set individually for each offset represented.

A modified subset of traces is then created, step 140, using an alignment technique. Ideally, the alignment of the traces with the model trace will remove residual moveout and compensate for structural dip. The preferred alignment technique employed in this exemplary embodiment is the conventional method of time varying trim statics. The time varying trim statics determines and applies static shifts (trim statics) for each trace in an ensemble or working subset of traces relative to the model trace. The statics are calculated independently for a set of fixed width time windows. After the shifts are calculated, linear interpolation is used to define a static shift for each time sample on output. An output trace is then interpolated from the input trace using sinc interpolation at each output point defined by the time varying static shifts. Time varying trim statics algorithms are readily available from a number of vendors in commercial packages. An example is Halliburton/Landmark ProMAX™ Seismic Processing Package, which has been used with this invention.

The modified subset of traces associated with this center or output node is then composited, step 150, to create a new enhanced subset of seismic data having an enhanced signal-to-noise ratio, relative to the original set of seismic data. In this exemplary and preferred embodiment, the compositing process occurs as follows.

Assume that for each of the 25 input nodes of a 5×5 aperture A, there are 10 original or unmodified traces that have been collected. Accordingly, there will a total of 250 modified traces associated with each aperture A and its center output node N after the modified subset of traces has been created.

For each node N, there will be 10 offsets associated with the respective 10 traces collected at that particular node N. The 25 modified traces associated with the first offset for each of the 25 input nodes are then summed or composited together to form a single first offset trace. Similarly, this summing procedure is repeated for each of the 25 modified traces related to the second offset so that a single second offset trace is created. This process is repeated for each of the 10 offsets until 10 single offset traces have been produced for a particular aperture A and its central output node N thus creating the enhanced subset of traces.

The rolling supergather aperture A is then incrementally moved or "rolled", step 160, to be selectively positioned relative to another of the output nodes N to thereby select another working subset of traces from the areal region 20. As shown in FIG. 2, aperture A is incremented horizontally to the right by one node position to be repositioned about output node $N_{74}$ to create an aperture $A_2$. The size and shape of the aperture A, i.e., a 5×5 array of nodes N, remains the same throughout the use of this example. A new working subset of traces and a new model subset of traces associated with output node $N_{74}$ are selected. Again, this model subset of traces is combined into a model trace for this particular working subset of traces. The traces of the working subset of traces is compared and aligned with the model trace and a new modified subset of traces is created and stored, which are associated with center node $N_{74}$. This modified subset of traces is then composited to reduce the number of modified traces back to the original number of traces in the working subset by summing the traces associated for each offset for the 25 nodes within the aperture $A_2$.

The above steps 110–160 are repeated with the supergather aperture A being incrementally moved along the output nodes N of row 7. After the aperture A has reached the end of this row $r_7$, i.e. with the creation of aperture $A_{10}$, the aperture A is then rolled up one row (see FIG. 3) to create aperture $A_{11}$, and then aperture $A_{12}$ and so on until traces within apertures A centered upon output nodes N in row 6 are processed. For each new selection of working subset of traces, a new modified subset of traces is created associated with a particular output node. Likewise, a new subset of enhanced traces is produced by compositing the particular modified subset of traces into an enhanced subset containing a reduced number of traces.

After the working subsets of traces associated with all output nodes in a row have been processed into new modified and enhanced subsets of traces, the rolling supergather aperture A is then relocated about a node N centered near the beginning of the next adjacent row of nodes N. Again, each of the modified subsets of traces are ideally composited into an enhanced subset of seismic traces. This rolling of the aperture and processing of traces are continued until new modified subsets of traces are created for each respective center or output node N. These enhanced subsets of traces are then assembled, step 170, or stored as a set of seimic data having enhanced signal-to-noise ratio as compared to the original or pre-processed set of seismic data.

Note output nodes N are preferably chosen only where a particular node can serve as the center node N of an aperture A with a full surrounding set of input nodes. Consequently the input nodes N on the exterior or fringe, i.e., the outer two rows and columns bounding the central output nodes N in this example, will not have any related composited enhanced traces. These composited seismic traces are thus reduced to a set of seismic data similar in size, although slightly smaller, than the original set of seismic data.

Although not preferred, the above method could be practiced with each of the input nodes N serving as a center or output node N. Where there are no actual adjacent nodes, and associated input traces, a zero contribution will be assigned to what would otherwise have been an input node. In this way, the size of the output set of enhanced seismic data would remain the same as was input prior to processing.

Theoretically, the compositing step to produce the enhanced subsets having a reduced number of traces need not be done. Displays could be directly generated from the modified subset of traces. However, due the very large number of modified traces at each output node, it is certainly preferred to composit and reduce the traces down to a more manageable size.

The compositing step 150 may use other techniques or methods to composit the modified traces into a set of seismic data having enhanced S/N ratio. For example, derivative products such as a gradient section can be constructed from the entire subset of modified traces of each aperture/output node without reducing down the number of traces. This can be done by performing a regression on each modified set of traces (i.e., 250 traces if 25 nodes having 10 traces/input node is used) to produce end products such as intercept and gradient.

Figure 5:
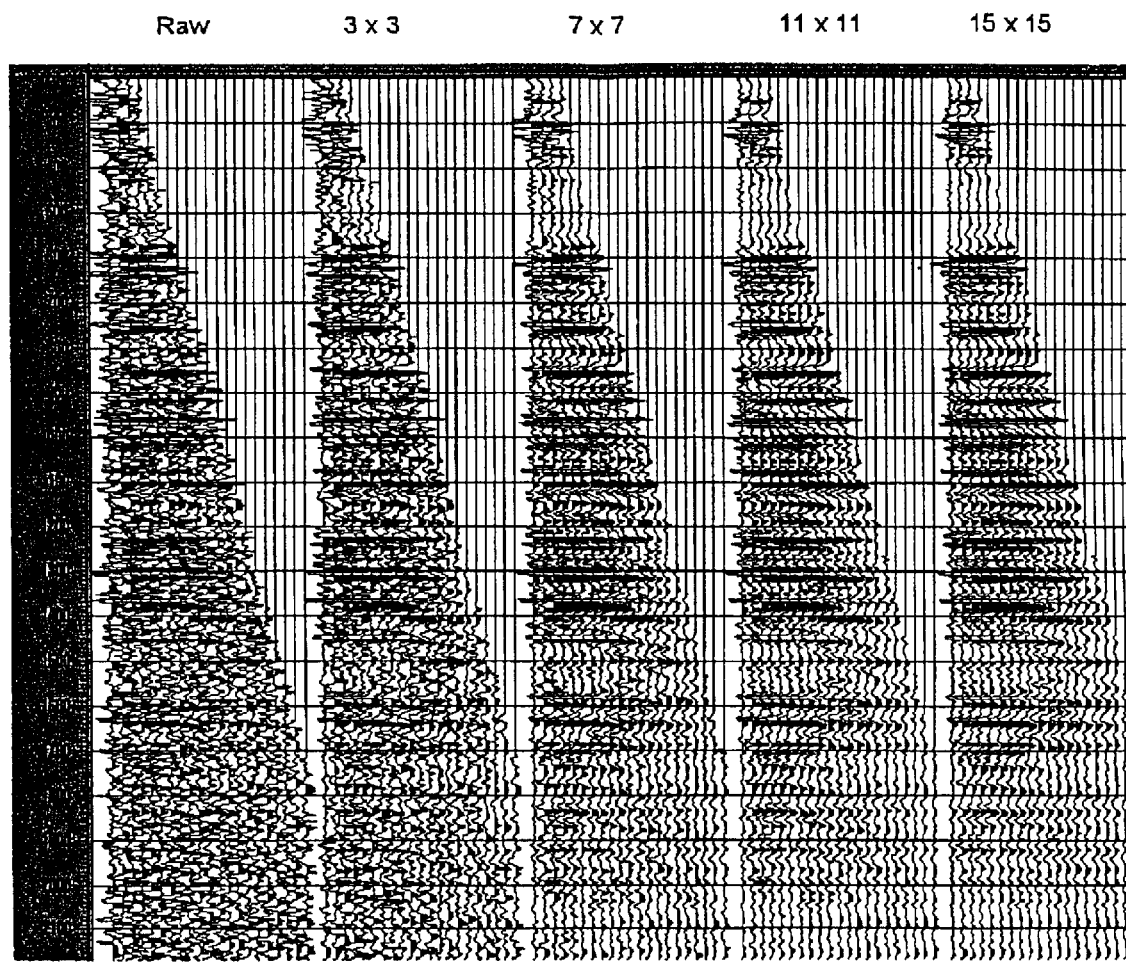
FIG. 5 shows a pre-stack CRP gather and resulting enhanced output gathers, made using the method of the present invention and employing rolling supergather apertures of differing sizes, i.e., 3×3, 7×7, 11×11 and 15×15 arrays of nodes.

Testing has shown that the dynamic static correction feature, utilizing the alignment technique employing time varying trim statics, of the present invention, is effective at enhancing S/N ratio of seismic data. FIG. 5 includes a raw pre-stack CRP gather. Also, shown are resulting enhanced output gathers which have been created using apertures of differing sizes, i.e., 3×3, 7×7, 11×11 and 15×15 rectangular arrays of nodes. From these displays of output gathers, it can be concluded that the dynamically statically enhanced gathers display a superior signal-to-noise ratio as compared to that of the original input seismic data.

While not wanting to be held to a particular theory, it is proposed that the present method overcomes these problems because a sharpened model trace is created for comparison as compared to an averaged or "smeared" comparison data set used to create a model trace in previous supergather methods.

The present invention makes a significant difference in the quality, continuity, resolution and signal-to-noise ratio of pre- or post-stack data and any derivative products (e.g., AVO attributes such as Gradient, offset stacks, and final stacks). It also improves other subsequent processing techniques, such as deconvolution, due to its ability to greatly suppress noise (one of the assumptions of the deconvolution is that the data is noise free).

The present invention further includes a computer-readable medium containing executable code for processing seismic traces to provide seismic data with enhanced signal-to-noise ratio. When the code is executed, the code performs the procedures of:

(a) receiving traces of a seismic survey collected over an areal region;

(b) selecting a working subset of traces from a subregion of the areal region using a rolling supergather aperture;

(c) selecting a model subset of traces from the working subset of traces using a predetermined set of rules such that the model subset of traces is selected from proximate the center of the working subregion;

(d) compositing the model subset of traces to form at least one model trace; and (e) creating a modified subset of traces by comparing the individual traces with the at least one model trace using an alignment technique.

Preferably, the alignment technique utilizes a dynamic static correction technique such as time varying trim statics to create the modified subset of traces. The at least one model trace is a ideally single model trace.

Preferably, the rolling supergather aperture is successively moved to new positions to select successive new working subsets of traces until the rolling supergather aperture has selected all of the traces from within the areal region. Steps (c)–(e) are performed on each of the successive new working subsets of traces to create modified subsets of traces associated with each new position of the rolling supergather aperture. Further, ideally the modified subsets of traces will be composited down to reduced enhanced subsets of traces. Finally, it is preferable that the enhanced subsets are assembled into a set of seismic data which have enhanced signal-to-noise ratio as compared to the original traces of the seismic survey.

While in the foregoing specification this invention has been described in relation to certain preferred embodiments thereof, and many details have been set forth for purposes of illustration, it will be apparent to those skilled in the art that the invention is susceptible to alteration and that certain other details described herein can vary considerably without departing from the basic principles of the invention.

What is claimed is:

1. A method for processing seismic traces to provide seismic data with enhanced signal-to-noise ratio which may be used to create enhanced display traces, the method comprising the steps of:

(a) receiving a seismic survey of traces collected over an areal region;

(b) selecting a working subset of traces from a subregion of the areal region using a supergather aperture;

(c) selecting a model subset of traces from the working subset of traces using a predetermined set of rules such that the model subset of traces is selected from proximate the center of the working subregion;

(d) compositing the model subset of traces to form at least one model trace; and (e) creating a modified subset of traces by comparing the individual traces with the at least one model trace using an alignment technique.

2. The method of claim 1 wherein:

the alignment technique utilizes time varying trim statics to create the modified subset of traces.

3. The method of claim 1 wherein:

the at least one model trace is a single model trace.

4. The method of claim 3 wherein:

the compositing of the model subset of traces is performed by summing the model subset of traces to create the single model trace.

5. The method of claim 1 further comprising:

compositing the modified subset of traces into an enhanced subset of traces.

6. The method of claim 1 wherein:

the supergather aperture is moved to a new position relative to the areal region to select a new working subset of traces; and steps (c)–(e) are performed on the new working subset of traces to create another modified subset of traces associated with this new position of the supergather aperture.

7. The method of claim 1 wherein:

the supergather aperture is successively moved to new positions to select successive new working subsets of traces until the rolling supergather aperture has selected all of the traces from within the areal region; and steps (c)–(e) are performed on each of the successive new working subsets of traces to create modified subsets of traces associated with each new position of the rolling supergather aperture.

8. The method of claim 7 wherein:

each of the new modified subsets of traces are composited into an enhanced subset of traces and the enhanced subset of traces are assembled into a set of seismic data having enhanced signal-to-noise ratio as compared to the traces of the seismic survey.

9. The method of claim 7 wherein:

the seismic survey of traces collected over the areal region is collected for a grid of nodes.

10. The method of claim 9 wherein:

the grid of nodes is arranged as a rectangular array.

11. The method of claim 9 wherein:

the rolling supergather aperture selects traces at a rectangular array of the grids.

12. The method of claim 9 wherein:

the rolling supergather aperture is centered about a node of the grid with the traces being selected from an array of nodes within the rolling supergather aperture; and the modified subset of traces for the rolling supergather aperture centered about the node is composited into an enhanced set of seismic traces.

13. The method of claim 12 wherein:

the model trace is a summation of the traces at the node about which the rolling supergather aperture is centered.

14. The method of claim 12 wherein:

the supergather aperture is incrementally rolled from grid to grid within the array to create a plurality of working subsets of traces;

steps (c)–(e) are repeated for each of the working subsets of traces to create new modified subsets of traces; and the new modified subsets of traces are each composited to create new enhanced subsets of traces.

15. The method of claim 14 wherein:

each of the nodes has a plurality of traces associated there with having a plurality of respective offsets; and the compositing of the modified subsets of traces includes summing each of the modified traces of the modified subset having a respective offset to produce the enhanced subset of traces for each rolling supergather aperture.

16. A computer-readable medium containing executable code for processing seismic traces to provide seismic data with enhanced signal-to-noise ratio, which when executed performs the procedures of: p1 (a) receiving traces of a seismic survey collected over an areal region;

(b) selecting a working subset of traces from a subregion of the areal region using a supergather aperture;

(c) selecting a model subset of traces from the working subset of traces using a predetermined set of rules such that the model subset of traces is selected from proximate the center of the working subregion;

(d) compositing the model subset of traces to form at least one model trace; and (e) creating a modified subset of traces by comparing the individual traces with the at least one model trace using an alignment technique.

17. The computer-readable medium of claim 16 wherein:

the alignment technique utilizes time varying trim statics to create the modified subset of traces.

18. The computer readable medium of claim 16 wherein:

the at least one model trace is a single model trace.

19. The computer readable medium of claim 16 wherein:

the rolling supergather aperture is moved to a new position relative to the areal region to select a new working subset of traces; and steps (c)–(e) are performed on the new working subset of traces to create another modified subset of traces associated with this new position of the rolling supergather aperture.

20. The computer readable medium of claim 16 wherein:

the rolling supergather aperture is successively moved to new positions to select successive new working subsets of traces until the rolling supergather aperture has selected all of the traces from within the areal region; and steps (c)–(e) are performed on each of the successive new working subsets of traces to create modified subsets of traces associated with each new position of the rolling supergather aperture.

* * * * *